United States Patent [19]

Kawai et al.

[11] 4,422,740

[45] Dec. 27, 1983

[54] LENS ASSEMBLY PROVIDED WITH AN AUTOMATIC FOCUSING DEVICE

[75] Inventors: Tohru Kawai, Kawasaki, both of Japan; Akiyasu Sumi, Yokohama

[73] Assignee: Canon Kabushiki Kaisha, Tokyo, Japan

[21] Appl. No.: 280,549

[22] Filed: Jul. 6, 1981

[30] Foreign Application Priority Data

| Jul. 7, 1980 | [JP] | Japan | 55/92883 |
| Jul. 9, 1980 | [JP] | Japan | 55/96744[U] |
| Jul. 9, 1980 | [JP] | Japan | 55/96745[U] |
| Jul. 9, 1980 | [JP] | Japan | 55/96746[U] |
| Aug. 7, 1980 | [JP] | Japan | 55/111984[U] |
| Jan. 9, 1981 | [JP] | Japan | 56/1495[U] |

[51] Int. Cl.$^3$ .............................................. G03B 3/10
[52] U.S. Cl. ................................................... 354/402
[58] Field of Search .................. 354/25, 195; 352/140

[56] References Cited

U.S. PATENT DOCUMENTS

| 4,057,327 | 11/1977 | Kumazawa | 354/195 X |
| 4,160,590 | 7/1979 | Reynard | 354/195 |
| 4,176,935 | 12/1979 | Smith | 354/195 |
| 4,272,174 | 6/1981 | Teramoto et al. | 354/195 |
| 4,283,131 | 8/1981 | Ohnuki et al. | 354/195 |
| 4,299,460 | 11/1981 | Hasegawa | 354/195 X |
| 4,309,077 | 1/1982 | Tomori | 354/195 X |

*Primary Examiner*—Michael L. Gellner
*Attorney, Agent, or Firm*—Fitzpatrick, Cella, Harper & Scinto

[57] ABSTRACT

An interchangeable lens assembly comprises a phototaking lens system for imaging an object, an automatic focusing device for detecting the object distance and outputting a signal for moving the lens system to an in-focus position, and a focus adjusting member for moving the lens system along the optical axis. The automatic focusing device includes a distance detector, a motor for generating a drive force to drive the lens system in accordance with an output signal from the distance detector, and a transmission for transmitting the drive force. The focus adjusting member is connected to the lens system and to the transmission, and the lens system is moved in accordance with either the manual rotation of a manually operated portion of the focus adjusting member about the optical axis or by the drive force from the motor through the transmission.

2 Claims, 19 Drawing Figures

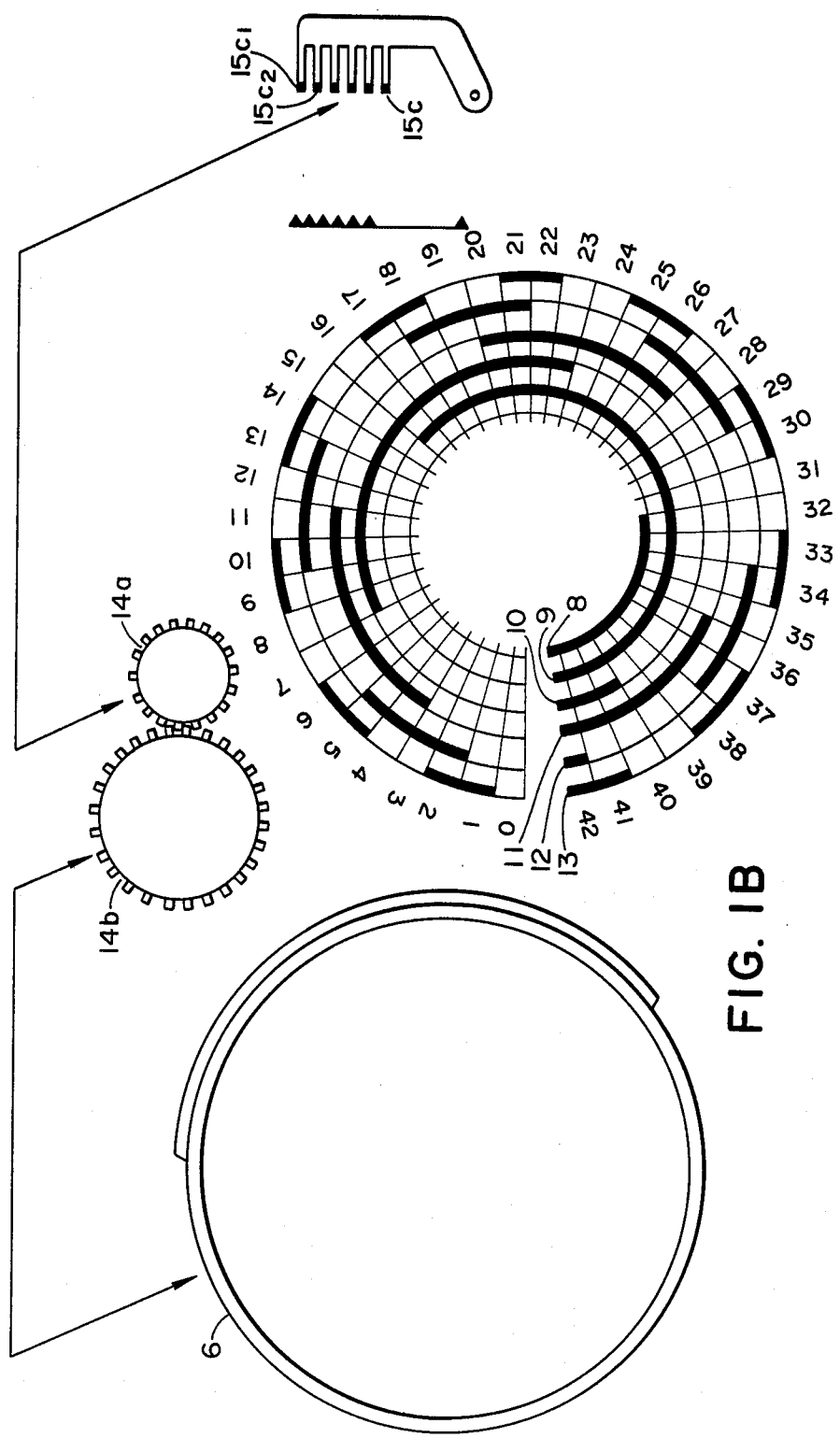
FIG. IB

FIG. 1C

| SET DISTANCE | GRAY CODE | | | | | | BINARY CODE |
|---|---|---|---|---|---|---|---|
| | TB0 MSB | TB1 | TB2 | TB3 | TB4 | TB5 LSB | |
| 0.94 | O | O | O | O | O | O | 0 |
| ∞ | O | O | O | O | O | − | 1 |
| | O | O | O | O | − | − | 2 |
| | O | O | O | O | − | O | 3 |
| | O | O | O | − | − | O | 4 |
| | O | O | O | − | − | − | 5 |
| | O | O | O | − | O | − | 6 |
| 0.67  4.7 | O | O | O | − | O | O | 7 |
| | O | O | − | − | O | O | 8 |
| | O | O | − | − | O | − | 9 |
| | O | O | − | − | − | − | 10 |
| | O | O | − | − | − | O | 11 |
| | O | O | − | O | − | O | 12 |
| | O | O | − | O | − | − | 13 |
| | O | O | − | O | O | − | 14 |
| | O | O | − | O | O | O | 15 |
| | O | − | − | O | O | O | 16 |
| | O | − | − | O | O | − | 17 |
| 0.58  2 | O | − | − | O | − | − | 18 |
| | O | − | − | O | − | O | 19 |
| | O | − | − | − | − | O | 20 |
| | O | − | − | − | − | − | 21 |

| SET DISTANCE | GRAY CODE | | | | | | BINARY CODE |
|---|---|---|---|---|---|---|---|
| | TB0 MSB | TB1 | TB2 | TB3 | TB4 | TB5 LSB | |
| | O | − | − | − | O | − | 22 |
| | O | − | − | − | O | O | 23 |
| | O | − | O | − | O | O | 24 |
| | O | − | O | − | O | − | 25 |
| | O | − | O | − | − | − | 26 |
| | O | − | O | − | − | O | 27 |
| | O | − | O | O | − | O | 28 |
| | O | − | O | O | − | − | 29 |
| | O | − | O | O | O | − | 30 |
| | O | − | O | O | O | O | 31 |
| | − | − | O | O | O | O | 32 |
| | − | − | O | O | O | − | 33 |
| | − | − | O | O | − | − | 34 |
| | − | − | O | O | − | O | 35 |
| | − | − | O | − | − | O | 36 |
| | − | − | O | − | − | − | 37 |
| | − | − | O | − | O | − | 38 |
| | − | − | O | − | O | O | 39 |
| | − | − | − | − | O | O | 40 |
| | − | − | − | − | O | − | 41 |
| 0.45 | − | − | − | − | − | − | 42 |
| | − | − | − | − | − | O | *43 |

FIG. ID

LENS ASSEMBLY PROVIDED WITH AN AUTOMATIC FOCUSING DEVICE

BACKGROUND OF THE INVENTION

1. Field of the Invention

This invention relates to a lens assembly, and more particularly to a lens assembly provided with an automatic focusing device for moving a focusing lens system to an in-focus position.

2. Description of the Prior Art

When an automatic focusing device is incorporated into an interchangeable lens assembly so that the distance of an object can be detected solely within the lens assembly and the focusing lens in the lens assembly can be moved to an in-focus position, automatic focusing photography becomes possible even when the lens assembly is mounted on a camera body without an automatic focusing device incorporated therein. However, the interchangeable lens assembly of an interchangeable lens type camera generally has a large diameter and is heavy. Accordingly, incorporation of an automatic focusing device therein would result in a further increase in the diameter and weight of the interchangeable lens assembly which in turn would make handling the camera more difficult.

Various constructions for providing an automatic focusing device on the barrel of an interchangeable lens assembly have heretofore been proposed and these constructions may be roughly grouped into two general types. The first type includes a distance detecting module, a battery and a focus driving system arranged as a unit on the lower portion of the lens barrel. This construction, which necessarily results in a downwardly bulging configuration of the lens assembly when mounted onto a camera body, has led to the following disadvantages:

1. During photography with the camera hand held, the operator's finger is liable to cover the distance detecting window so that an incorrect distance detection sometimes occurs;
2. During photography with the camera mounted on a tripod, the bulge on the lower portion of the lens barrel becomes a hindrance and good operability is not obtainable;
3. The downwardly bulging lens configuration fails to provide a compact camera design; and
4. If a portion of a drive unit or the like for the camera juts out, the bulge on the lower portion of the lens assembly may strike against such portion when the lens assembly is mounted on the camera body, thus preventing good handling or easy mounting.

The second type includes a distance detecting module, a battery and a focus driving system arranged as a unit on the upper portion of the lens barrel. This construction results in an upwardly bulging configuration of the lens assembly when mounted to a camera body and has led to the following disadvantages:

5. When a strobe unit is disposed above the pentaprism of the camera body, the light adjusting window of the strobe is hidden;
6. When use is made of a camera of the type in which the aperture value or the like is read through the viewfinder, the vicinity of the aperture value becomes so dark that the aperture value is difficult to read;
7. The upwardly bulging lens configuration fails to provide a compact camera design; and
8. If a portion of a motor drive unit or the like for the camera juts out, the bulge on the upper portion of the lens assembly may strike against such portion when the lens assembly is mounted on the camera, thus preventing good handling or easy mounting.

SUMMARY OF THE INVENTION

It is an object of the present invention to provide an interchangeable lens assembly having a phototaking lens system and a focus adjusting ring with a suitably disposed automatic focusing device including a distance detector, a motor for receiving a signal from the distance detector and outputting a drive force for driving the phototaking lens system to a desired position, and a transmission for receiving the drive force from the motor and transmitting it to the focus adjusting ring to move the phototaking lens system.

It is another object of the present invention to overcome the above-noted problems and disadvantages peculiar to the prior art by fixing a distance detector, motor, transmission, and a battery container of an automatic focusing device integrally onto a lens barrel and locating the distance detector at a position which is optimal for the distance detecting operation while producing no adverse effect on the photographing operation or on the non-functional surface of the photographing apparatus.

It is still another object of the present invention to enhance the operability of a hand held camera and lens by disposing an automatic focusing device on the lens barrel and disposing an associated power supply on a cover for the device.

It is yet another object of the present invention to provide a lens assembly having an automatic focusing device with a cover therefor which is of multi-surfaced configuration and a power supply switch disposed on one surface thereof to permit a finger (for example, the thumb) of the operator to readily reach the switch when holding the lens assembly and also to enable the operator to concentrate exclusively on photography without being concerned about the position of the switch.

The invention will become more fully apparent from the following detailed description thereof taken in conjunction with the accompanying drawings.

BRIEF DESCRIPTION OF THE DRAWINGS

FIG. 1B illustrates the construction of conductors on a code plate shown in FIG. 1A and the interconnection of conductor contacting brushes and a focus adjusting ring of the lens assembly through a transmission mechanism.

FIG. 1C is a conversion table for GRAY CODE signals and binary code signals.

FIG. 1D is a perspective view of a cover for covering the automatic focusing device shown in FIG. 1A.

DESCRIPTION OF THE PREFERRED EMBODIMENTS

Figure 1A:
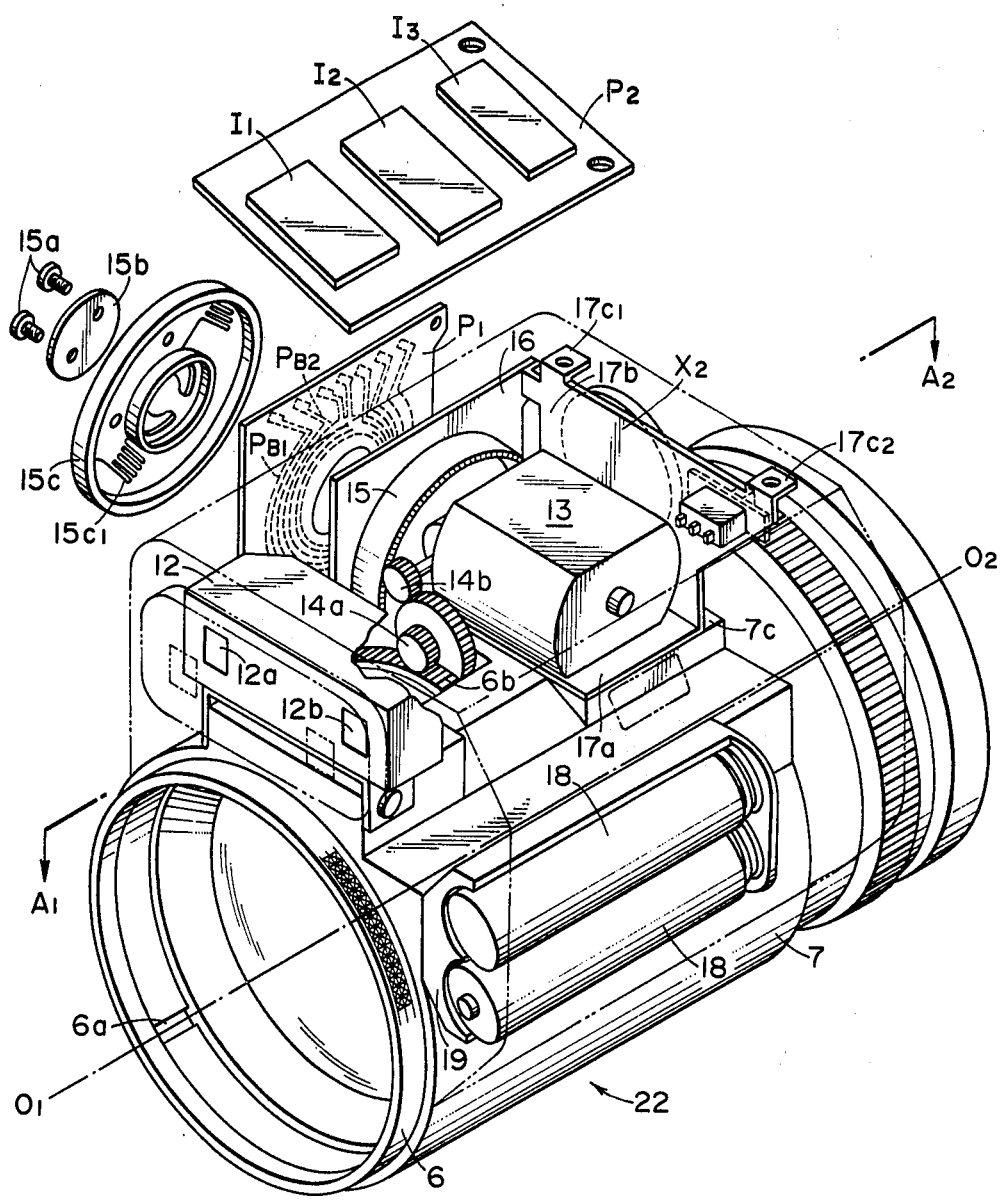
FIG. 1A is a perspective view of a lens assembly according to an embodiment of the present invention, illustrating the overall positional relationship of the components of an automatic focusing device incorporated therein.

FIG. 1A is a perspective view of a lens assembly 22 according to an embodiment of the present invention. Lens assembly 22 is provided with an automatic focusing device including a distance detector 12, motor 13, reduction gear train 14 and a battery container 19 fixed to a base barrel 7.

Figure 3:
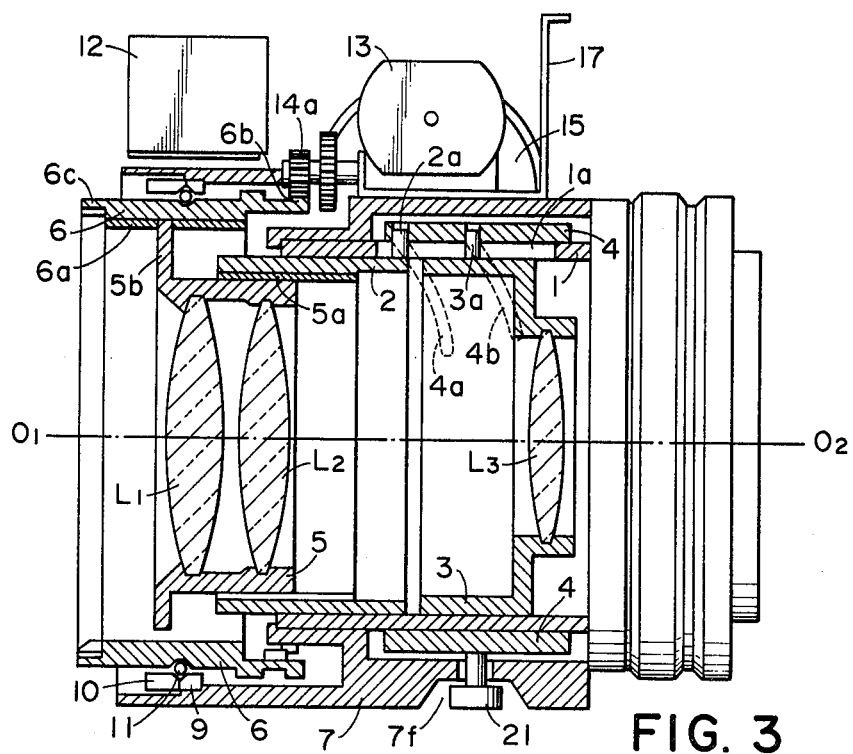
FIG. 3 is a cross-sectional view taken along lines $A_1$–$A_2$ of FIG. 1A.
Figure 6:
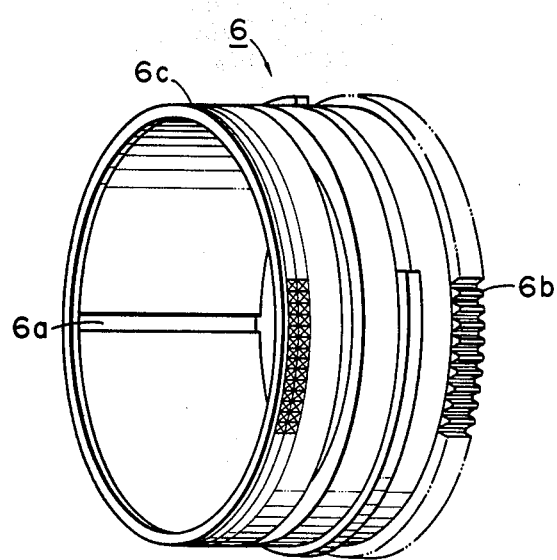
FIG. 6 is a perspective view of the focus adjusting ring of the present invention.
Figure 7:
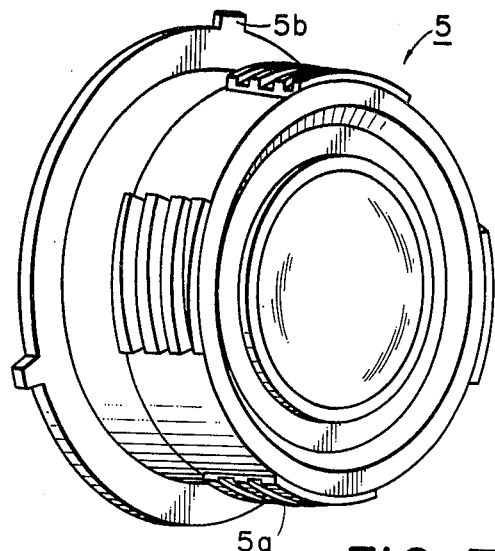
FIG. 7 is a perspective view of the focus lens holding barrel of the present invention.

Referring to FIG. 3, base barrel 7 is secured to a fixed barrel 1 by screws (not shown). Fixed barrel 1 has mounting means (not shown) at the rear end thereof for mounting the lens assembly to a camera body and it also supports lens elements 2, 3, 4, 2a, 3a, 5 and 6, lens groups $L_1$, $L_2$ and $L_3$, which constitute a conventional two-group zoom lens system. The lens groups $L_1$ and $L_2$ are optical lens which are effective to the focusing function and to the aberration correcting function. The lens group $L_3$ is movable in a direction parallel to the optical axis to thereby change the image magnification. Elements 2 and 3 are first and second lens holding barrels mounted within fixed barrel 1 for holding the zoom lens system which adjusts the focal length by means of lens group $L_3$ of one or more lens elements and corrects the aberration which results from focal length change by means of lens groups $L_1$, $L_2$ of one or more lens elements. Pin 2a and 3a project from lens holding barrels 2 and 3, respectively, and extend through a straight groove 1a which extends along the optical axis in fixed barrel 1 and into cam slots 4a and 4b formed in a cam cylinder 4 mounted around fixed barrel 1. A third lens holding barrel 5 for holding the focusing lens groups $L_1$, $L_2$ has a threadably engaging portion 5a which threadably engages lens holding barrel 2, a perspective view of which is shown in FIG. 7. The cylindrical flange portion 5b of third lens holding barrel 5 extends into a straight groove 6a (see FIG. 6) formed in the inner peripheral surface of a focus or distance adjusting ring 6 and parallel to the optical axis, and the forward and backward movement of third lens holding barrel 5 along the optical axis may be effected by the rotation of focus adjusting ring 6.

A first bearing ring 9 and a second bearing ring 10 are screwed into the inner peripheral surface of base barrel 7 and the first ring 9 and the second ring 10 are each provided with a sloped surface for holding bearings 11, the sloped surfaces forming a V-shaped circumferential groove on the circumference, and the bearings being held between the circumferential groove and a substantially V-shaped circumferential groove formed in the outer peripheral surface of focus adjusting ring 6. With this construction, focus adjusting ring 6 is rotatably supported on the inner peripheral surface of base barrel 7.

Figure 4:
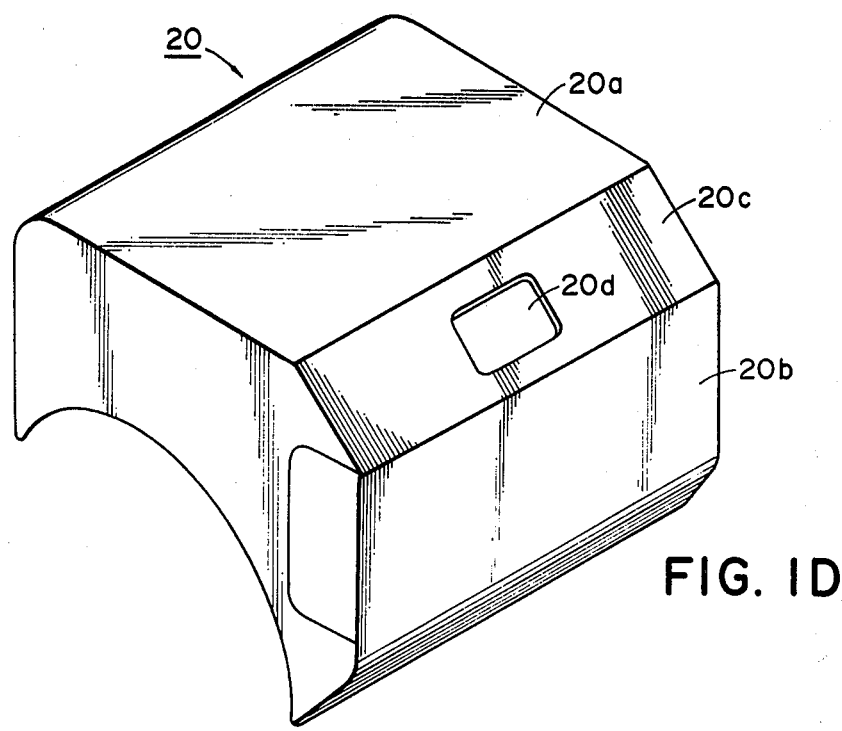
FIG. 4 is a perspective view of a base barrel on which may be mounted the components of the automatic focusing device according to the present invention.
Figure 4:
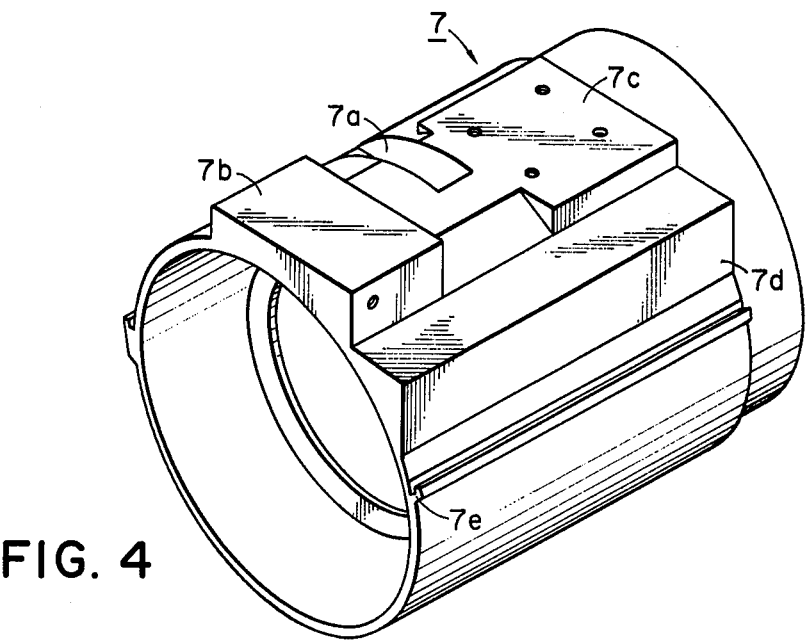

As best shown in FIG. 4, the base barrel 7 has an inner surface which is cylindrical. The lower half of its outer surface is also cylindrical while the upper half thereof is formed with a plurality of flat surfaces (pedestals 7b, 7c, 7d) for supporting thereon the distance detector 12, motor 13 and battery container 19 of the automatic focusing device.

The distance detector 12 measures the distance of an object to be photographed for controlling movement of focusing lens groups $L_1$, $L_2$ to the in-focus position.

Figure 5:
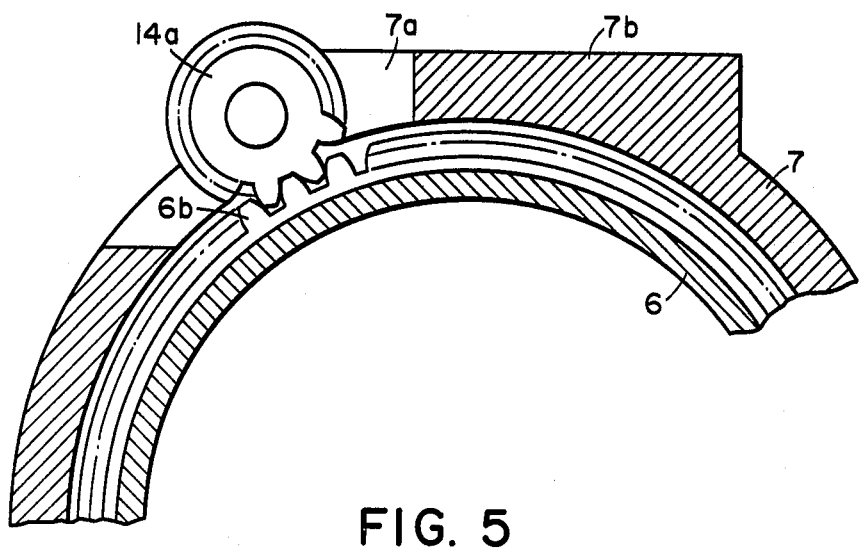
FIG. 5 is a fragmentary cross-sectional view illustrating the interconnection of the automatic focusing device with a focus adjusting ring through the base barrel.

Motor 13 is responsive to a signal from the distance detector and a signal indicative of the position of the focusing lens groups for driving the focus adjusting ring 6 to move the focusing lens groups to the in-focus position. Motor 13 is connected to a reduction gear train 14 including a plurality of drive transmitting gears 14a, 14b, gear 14a being in mesh engagement with a gear portion 6b (see especially FIGS. 5 and 6) formed on or secured to the outer peripheral surface of the focus adjusting ring 6. In order to provide a driving connection between the gear portion 6b of the focus adjusting ring 6 and driving gear 14a, an opening 7a is formed in a portion of base barrel 7. This opening 7a is provided at a location between the pedestals 7b and 7c which support thereon the distance detector 12 and motor 13, respectively, whereby the distance detector 12, reduction gear train 14 and motor 13 can be disposed in parallel along the direction of the optical axis.

Referring back to FIG. 1A, crown gear 15 is supported on a bearing portion of a holding plate 16 for rotation by the mesh engagement of the crown gear with gear 14b. A code plate $P_1$, shown in detail in FIG. 1B, having arcuate conductors $P_{B1}$, $P_{B2}$, ... arranged as a plurality of annular rings on an insulating plate, is provided on the outer surface of holding plate 16. A portion of crown gear 15 extends through a central aperture in code plate $P_1$ and supports a brush holding member 15c for rotation therewith by screws 15a and a plate 15b. Brush holding member 15c supports a plurality of brushes $15c_1$, $15c_2$, ... adapted to slidably contact the conductive and nonconductive portions on the code plate $P_1$ with relative movement therebetween and to put out conduction signals or nonconduction signals, combinations of which represent the GRAY CODE signals shown in FIG. 1C. Sinch brushes $15c_1$, $15c_2$, ... are interconnected with the toothed portion 6b of focus adjusting ring 6 through crown gear 15 and gears 14a, 14b, the positions of the brushes on the code plate are indicative of the position of the focusing lens groups $L_1$, $L_2$ along the optical axis $O_1$-$O_2$. Therefore, from the aforementioned GRAY CODE signals, addresses are represented by binary codes as shown in FIG. 1C and it is possible to indicate the position of the focusing lens groups $L_1$, $L_2$. TB0 TB1, ..., TB5 in FIG. 1C are symbols which represent by binary signals the conductive-nonconductive conditions defined by brushes $15c_1$, $15c_2$, ... and the conductors.

Referring numeral 17 designates a holding plate having an L-shaped cross-section. A flat portion 17a is secured to pedestal 7c of base barrel 7 and supports thereon motor 13.

Tabs $17c_1$ and $17c_2$ extend outwardly from a vertical portion 17b of holding plate 17 in a plane parallel to the plane of pedestals 7b, 7c of base barrel 7, and are formed with threaded holes for securing a circuit base plate $P_2$ which supports integrated electric circuits $I_1$-$I_3$.

Electric circuits $I_1$-$I_3$ are adapted to receive as inputs the electrical signal of the object distance information detected by the distance detector 12 and the electrical signal of the position of the focusing lens groups $L_1$, $L_2$ produced by code plate $P_1$, to calculate a focus signal for the forward or reverse rotation of motor 13. The details of the distance detector 12, electric circuits $I_1$-$I_3$, code plate $P_1$ and the circuits therefor in the present embodiment are described in U.S. Application Ser. No. 944,974, filed Sept. 22, 1978 and U.S. Application Ser. No. 121,690, filed Feb. 15, 1980 and therefore they need not be described further herein.

A flat surface 7d of base barrel 7 extends in a direction parallel to the optical axis and provides a pedestal to which is fixed a battery container 19 for retaining batteries 18 therein. The battery container 19 may be attached to extend along the direction of the optical axis to permit use of cylindrically shaped batteries such as "size AA" batteries. Moreover, since pedestal 7d for battery container 19 has a thickness in the radial direction of base barrel 7, it also serves as a support beam for increasing the strength of the entire base barrel.

A cover 20 may be attached to the lens assembly by sliding it along a rail 7e shown in FIG. 4 after the distance detector 12, motor 13 and battery container 19 have been placed on pedestals 7b, 7c and 7d, respectively, of base barrel 7, after the circuit base plate $P_2$ has been fixed to tabs $17c_1$ and $17c_2$ and after batteries 18 have been inserted into the battery containing unit 19. The cover 20, as shown in FIG. 1D, has a multi-surfaced configuration including a first flat surface 20a for covering components including the distance detector 12, transmission gears 14a, 14b and motor 13, a second flat surface 20b for covering battery container 19 and batteries 18, and a third flat surface 20c interposed between the first and second flat surfaces 20a and 20b. Designated by 20d is an aperture for accommodating a power supply switch 24 for initiating an autofocus operation as will later be described.

In the lens assembly of the present invention, there may be provided a conventional diaphragm unit and signal transmitting mechanism on the camera side and the lens side, respectively, to thereby enable automatic exposure control and exposure control by manual aperture setting.

Referring back to FIG. 3, a groove 7f of substantially V-shaped cross-section is provided in a portion of the circumference of base barrel 7, and an operating pin 21 projects from cam cylinder 14 and extends through the bottom of groove 7f. This operating pin is rotatably operable from outside of the lens assembly and by rotating the operating pin 21 about the optical axis, cam cylinder 4 may be rotated. As a result, the first and second lens holding barrels 2 and 3 are moved along the optical axis in accordance with the engaging relationship between pins 2a, 3a and the points of intersection between straight groove 1a and cams 4a, 4b, thereby effecting a focal length changing operation and a correcting operation by movement of the zoom lens group $L_3$ and compensating lens groups $L_1$, $L_2$.

The positional relationship between fixed barrel 1 and base barrel 7 is such that, when the lens assembly 22 is mounted onto a camera body 23, the distance detector 12, the reduction gear train 14 and the motor 13 are arranged on the base barrel 7 in a row along the optical axis and are disposed along the upper half of the lens assembly so as to be inclined with respect to the camera base when viewed from the front. That is, base barrel 7 is secured to fixed barrel 1 by means as screws, as previously described, and means for mounting the lens barrel 22 to the camera body 23 is provided at the rear end of fixed barrel 1. Accordingly, base barrel 7 and fixed barrel 1 are fixed together so that distance detector 12 and associated components are disposed in the upper half of the lens assembly and inclined with respect to the base of the camera body when the coupling position of the bayonet ring of the mounting means and the coupling position of the bayonet ring on the camera body side are interconnected with each other.

Figure 9:
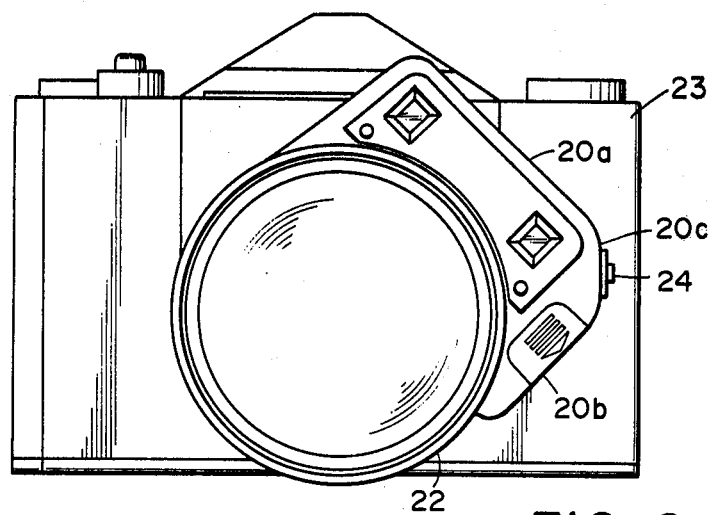
FIG. 9 is a front elevational view of the camera and lens assembly shown in FIG. 8.
Figure 10:
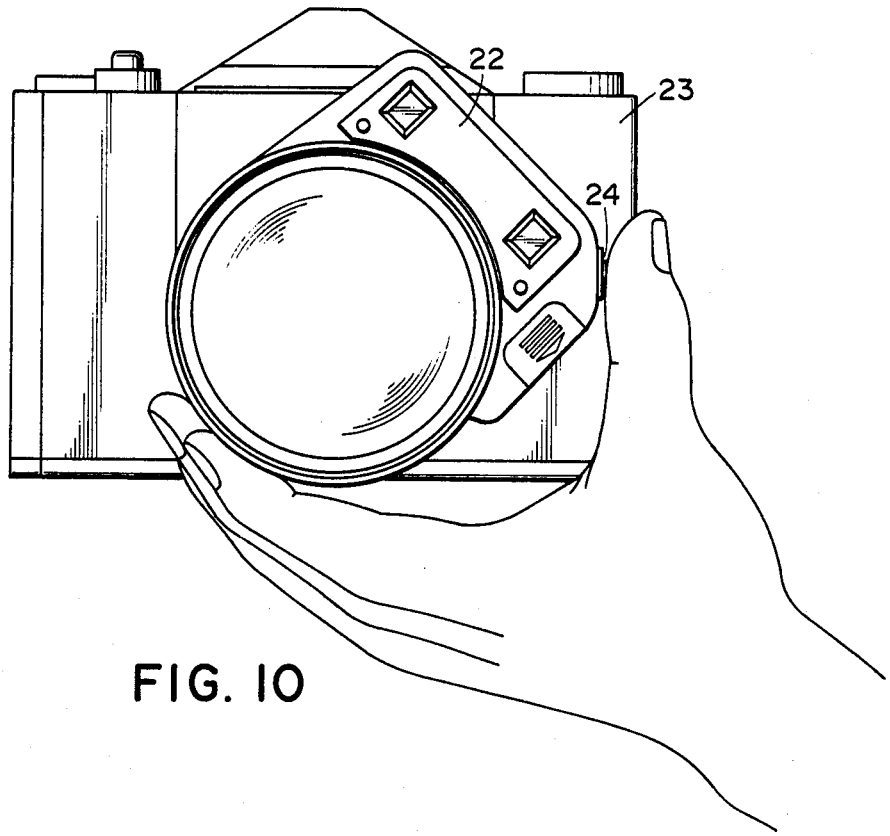
FIG. 10 is similar to FIG. 9 but shows the camera and lens assembly held by an operator with the lens assembly gripped by the operator's left hand, and particularly shows the manner in which the thumb touches a power supply switch.
Figures 11, 12:
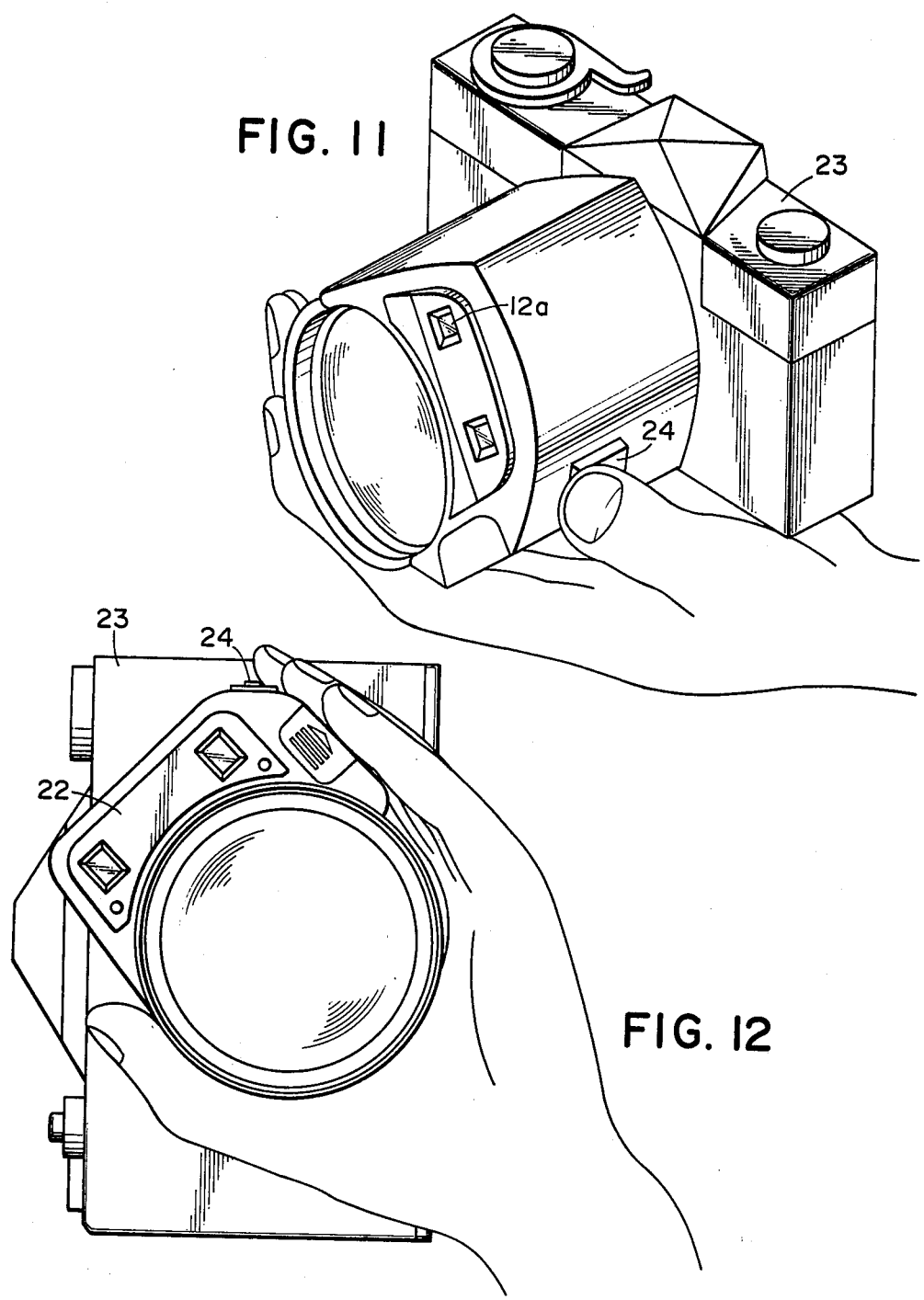
FIG. 11 is a perspective view of the camera and lens assembly held by the operator in the manner shown in FIG. 10.
FIG. 12 is a front elevational view of the camera and lens assembly with the camera body rotated through 90° from the position shown in FIG. 10, and shows the manner in which the power supply switch is operated by the middle finger of the operator.
Figure 13:
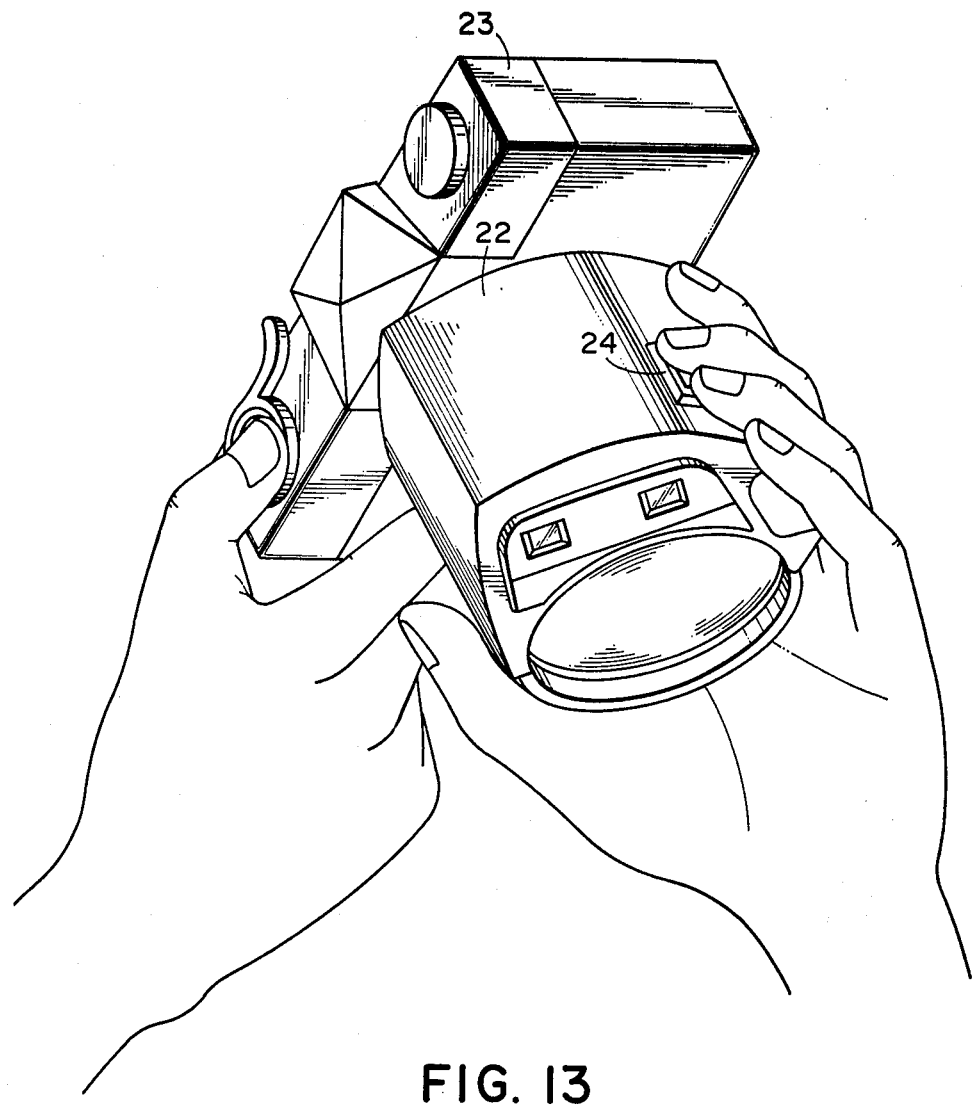
FIG. 13 is a perspective view of the camera and lens assembly held by the operator in the manner shown in FIG. 12.

An optimal inclined position is provided when the automatic focusing device is positioned at the right upper half as viewed from the front of the camera, as shown in FIG. 9. If the automatic focusing device is disposed at any other location, it would hinder the mounting of a motor drive unit, or the light-receiving window of a flash device, or would interfere with the holding of the camera. Thus, such constructions would be inappropriate for systematic photography using a camera in combination with conventional accessory devices.

Figure 8:
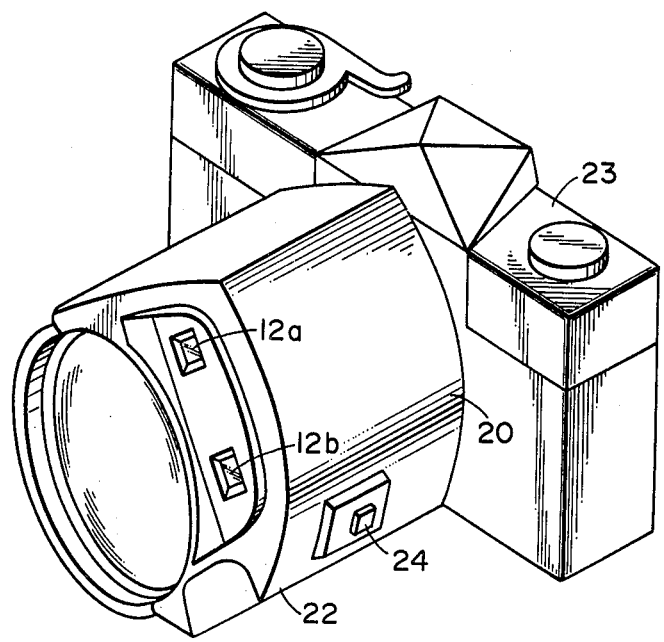
FIG. 8 is a perspective view of the lens assembly of the present invention mounted onto a camera body.

As shown in FIGS. 8 and 9 the power supply switch 24 is provided for operation of the electric circuits of the automatic focusing device. When this switch 24 is depressed by an operator while holding the camera, light from an object which passes through the distance detecting windows 12a and 12b is utilized by the distance detector 12 to compute the distance to the object. At the same time, the position of the focus adjusting ring 6 is detected and the motor 13 rotates until the focus detecting ring 6 moves the focusing lens groups to the in-focus position by means of the driving connection between the gears 14a, 14b and the gear portion 6b of focus detecting ring 6.

As was earlier explained, switch 24 is disposed on cover 20 for the automatic focusing device. The cover 20 is formed with a plurality of flat surfaces 20a, 20b and 20c, to facilitate handling when the lens assembly is held in any of various positions as shown in FIGS. 10 to 13. With this arrangement and construction, the photographer's finger (for example, thumb) naturally or easily reaches switch 24 in any of the various holding positions as shown in FIGS. 10 to 13, thereby permitting the photographer to depress the switch in a natural manner while aiming at the object.

Figure 2:
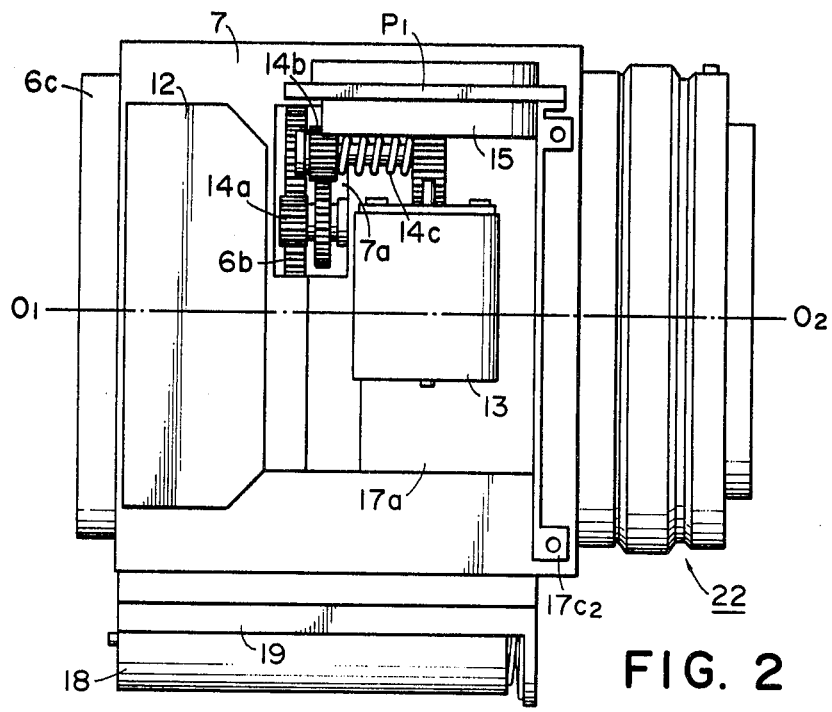
FIG. 2 is a plan view of the lens assembly with the circuit base plate $P_2$ of FIG. 1A removed.

The present invention also permits manual focus adjustment. As shown in FIG. 2, gear 14b is an idler gear which is interconnected with motor 13 through a coil spring 14c which provides a friction coupling. To perform a manual focus adjustment, focus adjusting ring 6 is rotated by the operator and this overcomes the frictional connection between idler gear 14b and spring 14c.

Figure 14A:
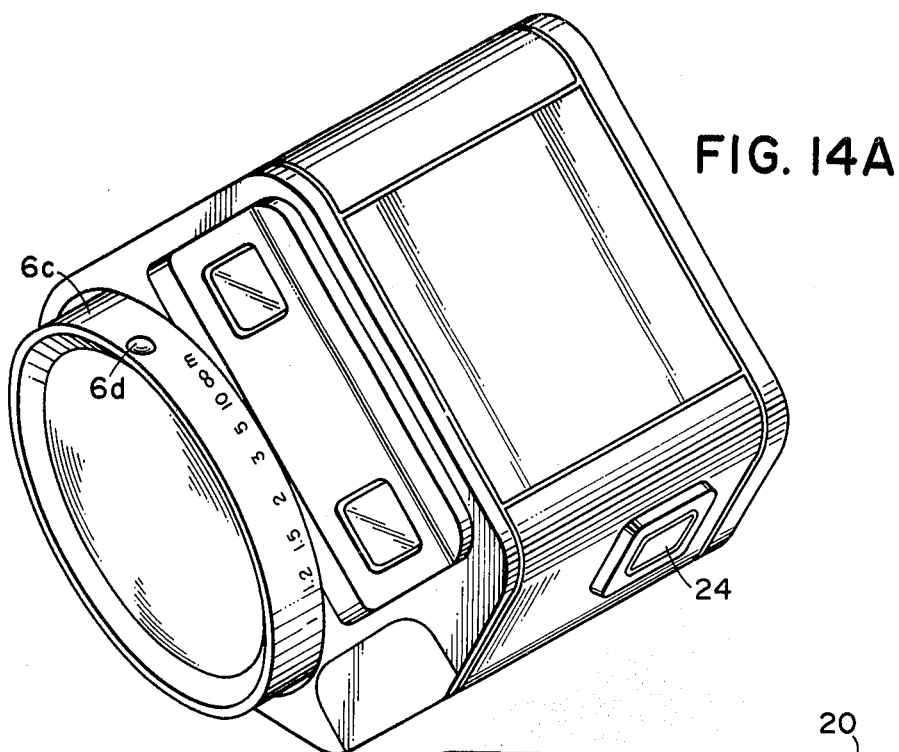
FIGS. 14A and 14B are a perspective view and a front view, respectively, of an embodiment in which an index mark is provided on the outer periphery of the manual operating portion of the focus adjusting ring.
Figure 14B:
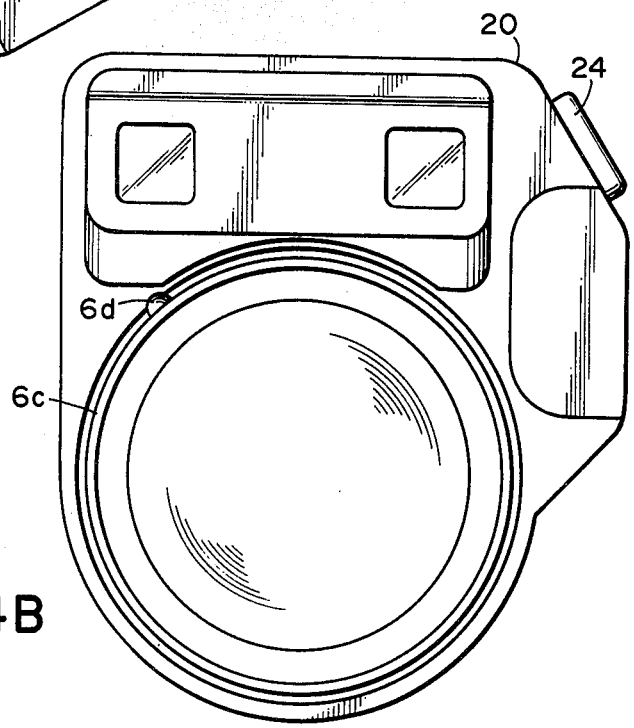

FIGS. 14A and 14B show another embodiment of the present invention. In this embodiment, a distance scale in meters or feet and an index mark 6d may be provided on a projecting portion 6c of the focus adjusting ring 6 which is used for manual forms adjustment. Index mark 6d is convenient for the photographer when taking a photograph while standing away from the camera. That is, when the photographer steps away from the camera during remote control photography or self-timer-controlled photography, it may not be clear to the photographer whether the focus adjusting ring 6 has been rotated to effect a focus adjustment after depression of switch 24 for an autofocus operation. Therefore, the provision of a noticeable index mark on the outer periphery of the focus adjusting ring 6 enables the photographer to easily see whether the focus adjusting ring 6 has been rotated, even if he is far from the location of the camera.

Figure 15:
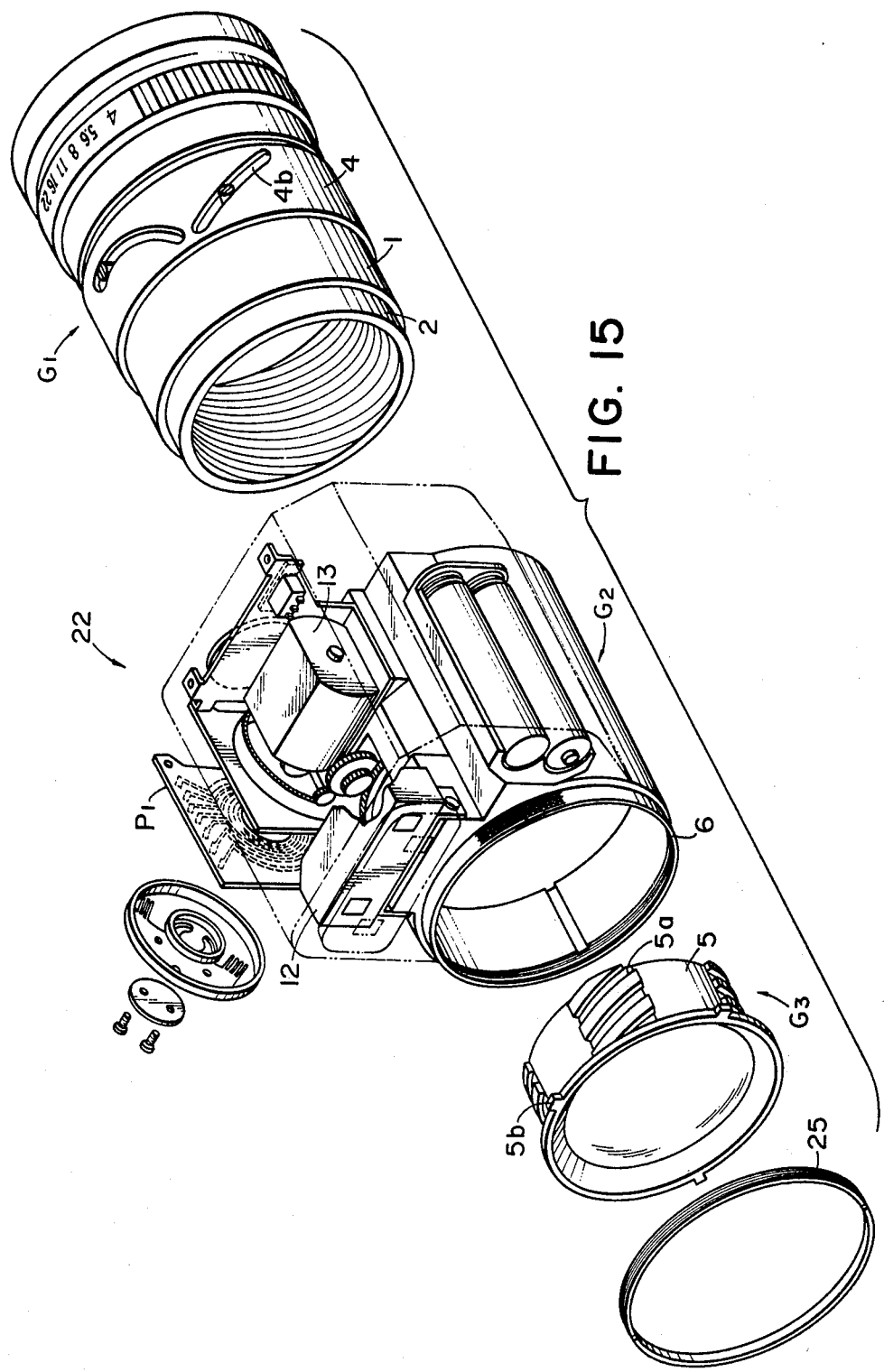
FIG. 15 is an exploded perspective view showing the lens assembly divided into blocks to facilitate assembly.

FIG. 15 shows an example of the components of an interchangeable lens assembly having an automatic focusing device, in accordance with the present invention to facilitate assembly. The interchangeable lens assembly 22 of the present invention may be divided into two or three blocks, a three block construction being shown. A first block $G_1$ includes a zoom lens mechanism, a second block $G_2$ includes the base barrel having mounted thereon the distance detector 12, motor 13, reduction gear train 14, code plate $P_1$, circuit base plate $P_2$, and focus adjusting ring 6, and a third block $G_3$ including lens holding barrel 5 and focusing lens groups $L_1$, $L_2$.

The zoom lens mechanism of the first block $G_1$ is constructed as shown in FIG. 3. The holding barrel 3 for holding a compensating lens group $L_4$ and the holding barrel 2 for the zoom lens group $L_3$ are inserted into fixed barrel 1, the cam cylinder 4 is inserted onto the fixed barrel, and the engaging pins 2a and 3a are caused to engage the points of intersection between the straight groove 1a and cam slots 4a, 4b. A mount mechanism for mounting the lens assembly to the camera is attached to the rear end of fixed barrel 1 by any conventional means.

The second block $G_2$ comprises, as previously described, the distance detector 12, reduction gear train 14, motor 13, circuit base plate $P_2$, etc. all mounted on the pedestals of base barrel 7.

The first block $G_1$ is inserted into the hollow portion of base barrel 7. Then the relative positions of blocks $G_1$ and $G_2$ are adjusted and the base barrel 7 is coupled to fixed barrel 1. During the assembly of the second block $G_2$, the focus adjusting ring 6 as well as the ball bearing means 9, 10 and 11 are incorporated into the base barrel 7.

After the first block $G_1$ and the second block $G_2$ are connected together, the third block $G_3$ is inserted into the forward end of the base barrel with the projected portion 5b on the circumference of the focusing lens holding barrel 5 caused to engage the straight groove 6a in the inner periphery of the focus adjusting ring 6, and the threaded portion 5a of the lens holding barrel is screwed onto the threaded portion of lens holding barrel 2 of first block $G_1$. A keep ring 25 is then threaded into the focus adjusting ring 6.

According to the present invention, as has hitherto been described, the focus adjusting member 6 is provided with a manual operating portion and is adapted to receive the drive force from the automatic focusing device, thus enabling the selection of automatic focusing operation and manual focusing operation. Thereby, any object at a distance which cannot be covered by the distance detecting capability of the distance detector can also be photographed. In addition, by the provision of the ball bearings disposed in the rotational portion of the focus adjusting member, both the motor load and the load during manual operation can be reduced.

Also, the present invention is effective to simplify the construction of the lens assembly by providing base barrel 7 on which are placed the distance detector, motor, reducing gear train, etc. which constitute the automatic focusing device, and enables the entire automatic focusing device, or at least the distance detector, to be inclined with respect to the base of the camera.

Further, the battery container is mounted on the base barrel 7 and the cover 20 is formed with a plurality of flat surfaces, whereby the lens assembly can be held more easily during photography.

Still further, locating the power supply switch 24 of the automatic focusing device on one of said flat surfaces facilitates camera operation.

Having thus described the invention with particular reference to the preferred forms thereof, it will be apparent to those skilled in the art to which the invention pertains, after understanding the invention, that various changes and modifications may be made therein without departing from the scope of the invention as defined by the claims appended thereto.

What we claim is:

1. An interchangeable lens assembly provided with an automatic focusing device, comprising:
   (a) a phototaking lens system for imaging an object;
   (b) a first fixed barrel for holding said phototaking lens system for movement in a direction along its optical axis;
   (c) a second fixed barrel;
   (d) an automatic focusing device including a distance detector mounted on said second fixed barrel for detecting the object distance and for producing a drive force for automatically moving said phototaking lens system to an in-focus position, wherein when said lens assembly is mounted to a camera body said distance detector is disposed on the upper half of said lens body and is inclined with respect to the base of the camera body;
   (e) a focus adjusting member for moving said phototaking lens system, said focus adjusting member and said automatic focusing device being connected to each other through an aperture formed in a portion of said second fixed barrel, said phototaking lens system being moved in accordance with the drive force from said automatic focusing device; and
   (f) cover means for covering at least a portion of said automatic focusing device, said second fixed barrel covering the portion of said lens assembly which is not covered by said cover means.

2. An interchangeable lens assembly according to claim 1, wherein said cover means is mounted on a guide rail provided on said second fixed barrel.

* * * * *

UNITED STATES PATENT AND TRADEMARK OFFICE
CERTIFICATE OF CORRECTION

PATENT NO. : 4,422,740

DATED : December 27, 1983

INVENTOR(S) : AKIYASU SUMI, ET AL.

It is certified that error appears in the above-identified patent and that said Letters Patent is hereby corrected as shown below:

On the Title Page, "[75] Inventors: Tohru Kawai, Kawasaki, both of Japan; Akiyasu Sumi, Yokohama" should read --[75] Inventors: Akiyasu Sumi, Yokohama; Tohru Kawai, Kawasaki; both of Japan--.

Column 3, line 53, "lens" should read --lenses--.

Column 5, line 8, between "TB0 TB1" insert a comma.

Column 7, line 10, "forms" should read --focus--.

Signed and Sealed this

Tenth Day of April 1984

[SEAL]

Attest:

Attesting Officer

GERALD J. MOSSINGHOFF

Commissioner of Patents and Trademarks